Jan. 16, 1934.   H. A. HICKS   1,943,528
COWLING RING FOR AIRPLANE ENGINES
Filed April 6, 1931   4 Sheets-Sheet 1

INVENTOR.
Harold A. Hicks
BY
ATTORNEYS.

Jan. 16, 1934.  H. A. HICKS  1,943,528
COWLING RING FOR AIRPLANE ENGINES
Filed April 6, 1931   4 Sheets-Sheet 2
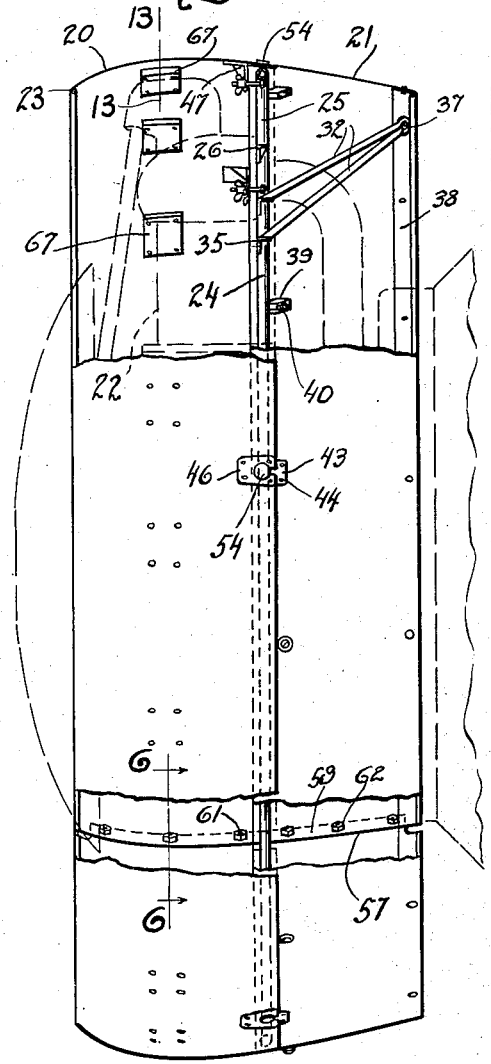
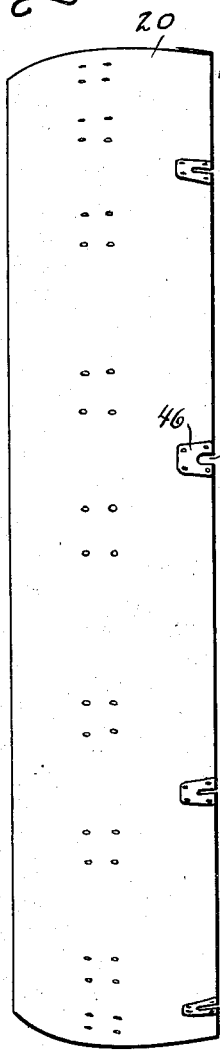
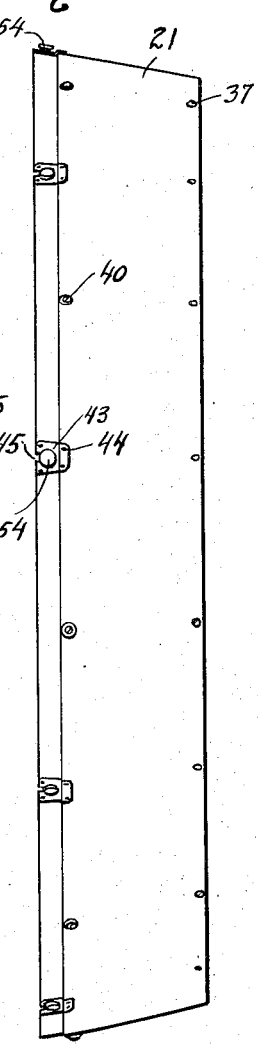
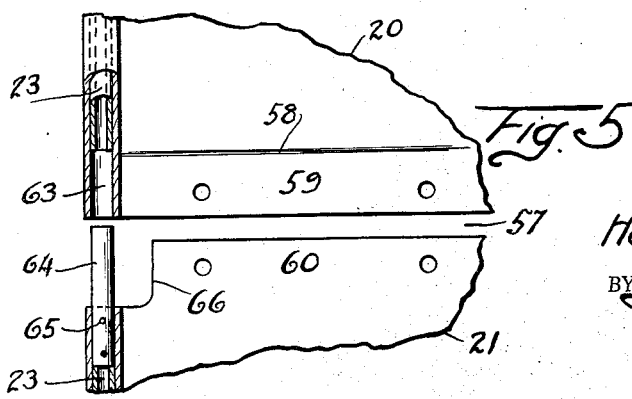
INVENTOR.
Harold A. Hicks
BY Joseph Farley
C. A. Davis
ATTORNEYS

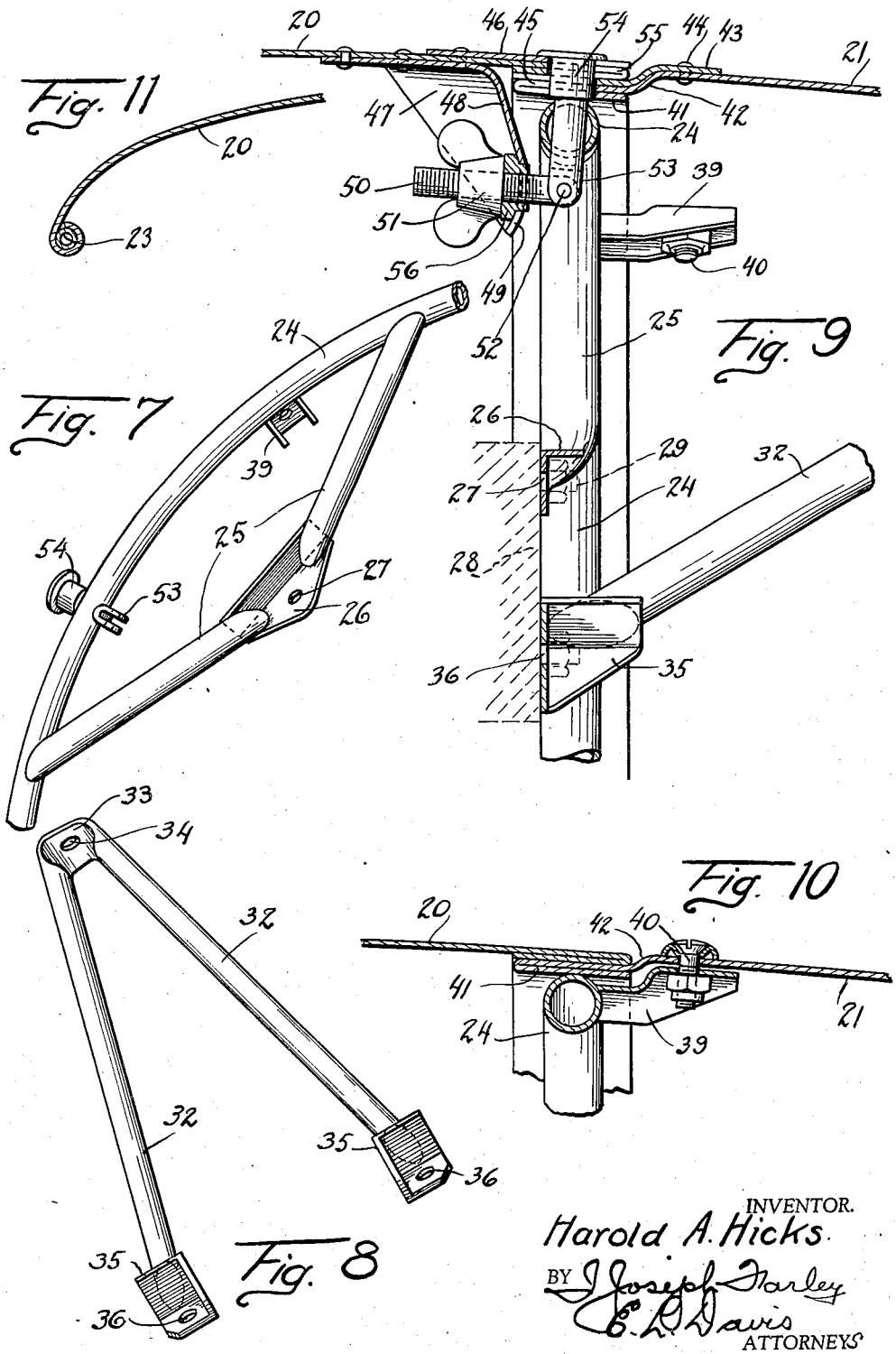

Jan. 16, 1934.        H. A. HICKS        1,943,528
COWLING RING FOR AIRPLANE ENGINES
Filed April 6, 1931        4 Sheets-Sheet 4
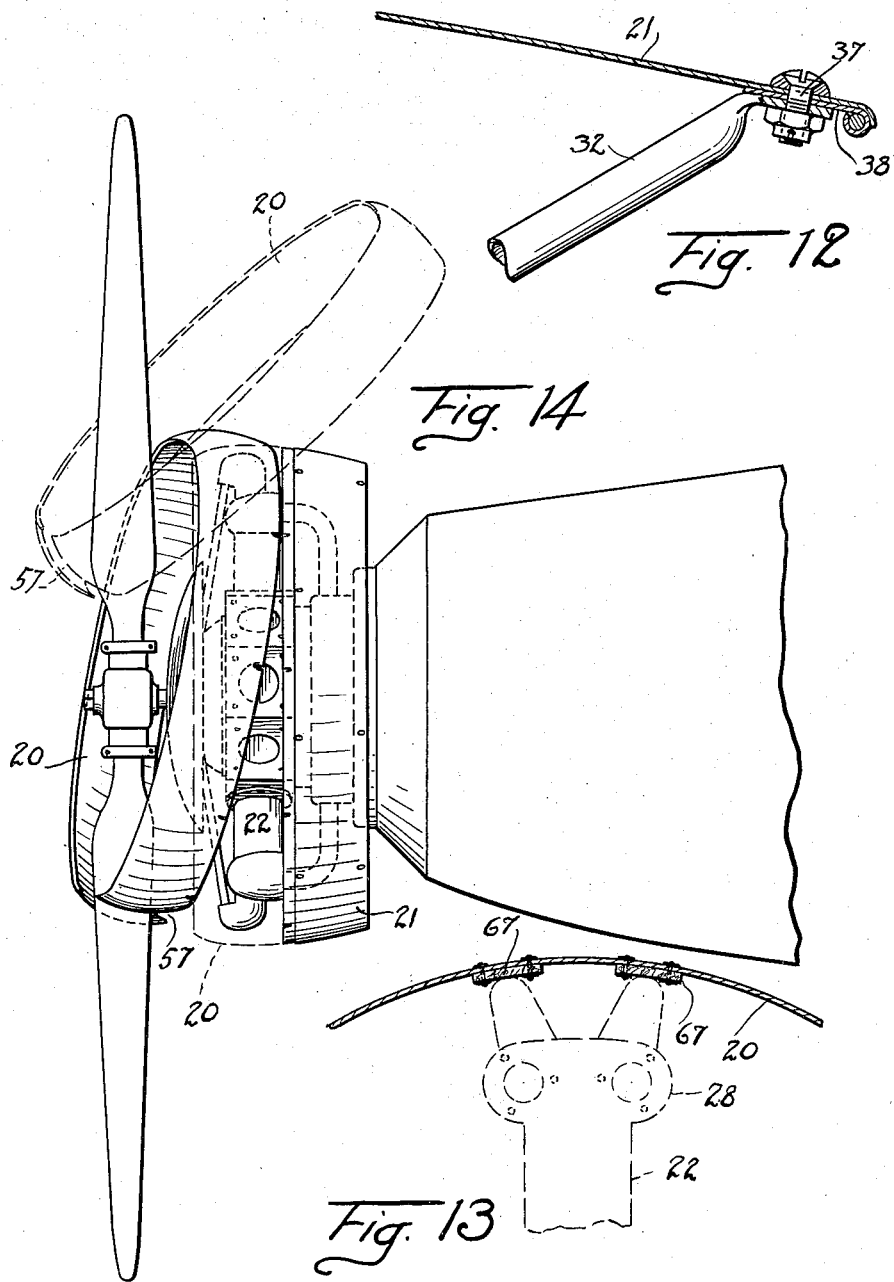
INVENTOR.
Harold A. Hicks
BY
ATTORNEYS Patented Jan. 16, 1934

1,943,528

UNITED STATES PATENT OFFICE 1,943,528

COWLING RING FOR AIRPLANE ENGINES

Harold A. Hicks, Detroit, Mich., assignor to Ford Motor Company, Dearborn, Mich., a corporation of Delaware Application April 6, 1931. Serial No. 528,129

20 Claims. (Cl. 244—31)

This invention relates to aircraft and has for its principal object to provide a new and improved construction of a cowling ring for the engines of such craft and particularly for the static radial type of engine now commonly used on airplanes.

In connection with the general problem, the importance of which has long been recognized in the airplane art, of reducing as much as possible the parasitic resistance of airplanes, it was but natural that in fairing the parts other than the wings, attention should be given to the provision of fairing or cowling for the engine.

It was also recognized that the elimination, or at least the reduction to a minimum, of turbulence in the air stream could most effectively be secured by stream-lining the fairing or cowling, or in other words in designing and constructing such parts in accordance with the well known data obtained as the result of the investigation of airfoil sections. Therefore in the design of an engine cowling ring used in this country on a plane known as the "Alert" constructed and flown more than a decade ago, the broad principle of the use of an engine cowling of airfoil section was employed.

More recently the subject of engine cowlings for air cooled, static, radial airplane engines was thoroughly investigated by the National Advisory Committee for Aeronautics and the results of such investigations published so that today such cowling rings are commonly known here as N. A. C. A. rings. The tests made by the N. A. C. A., have shown that a reduction of drag as high as forty percent may be secured by a properly designed cowling ring which encircles the engine.

In view of the above the present invention therefore relates, not to the broad principle of providing an airplane engine with a cowling ring of aerofoil section, but has for its object to provide improvements in constructional details by means of which the installation of the ring may be more readily accomplished and removal of the ring, or a portion thereof, may be conveniently effected for inspection, servicing and repair of the engine.

The above and other objects of the invention will appear more fully from the following more detailed description and by reference to the accompanying drawings forming a part thereof, wherein is shown by way of illustration for the purposes of this application, a satisfactory construction example of a cowling ring embodying the principles of the present invention.

Fig. 2 is a side elevation partly in section;

Fig. 3 is a side elevation of the front portion of the cowling ring;

Fig. 4 is a similar view of the rear portion of the ring;

Fig. 5 is an enlarged detail, partly in section, of the connection at the meeting edges of the split of a ring portion;

Fig. 7 is a detail in perspective of a supporting ring for the cowling and one of the brackets for attaching the same to the engine;

Fig. 8 is a perspective view of another bracket for said supporting ring;

Fig. 9 is an enlarged sectional detail taken substantially on the line 9—9 of Fig. 1;

Fig. 10 is an sectional detail on the line 10—10 of Fig. 1;

Fig. 11 is an enlarged section through the leading edge and a portion of the front section of the cowling ring;

Fig. 12 is an enlarged detail of the attachment of the bracket of Fig. 8 to the rear ring section;

Fig. 13 is a detail of the buffer pads between the engine and cowling ring, and

Fig. 14 is a view showing the manner in which the ring sections are installed on, or removed from, the engine.

Figure 1:
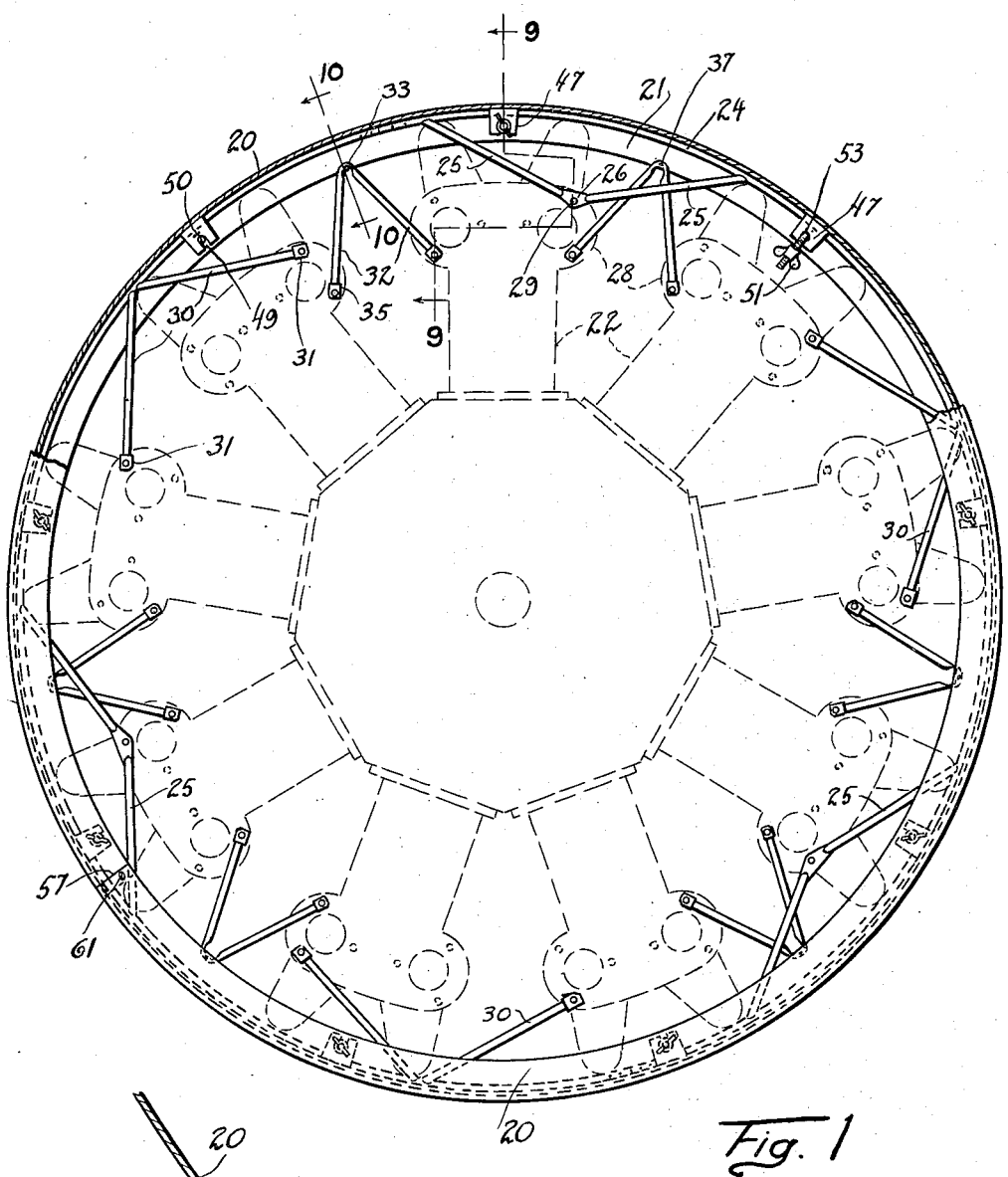
Fig. 1 is a front view partly in elevation and partly in section of a cowling ring constructed in accordance with the principles of the invention, the dotted lines showing the cylinders of a static radial air cooled aircraft engine.

As shown in Figs. 2 to 4 inclusive, a cowling ring constructed in accordance with this invention consists of a front section 20 and a rear section 21 which sections when connected together as shown in Fig. 2 form a unitary ring assembly which projects slightly forward of, and also to the rear of, the engine's cylinders 22. As shown in Fig. 1 the assembled ring completely encircles and surrounds the engine's cylinders.

The completely assembled ring has a cross sectional configuration which as shown in Fig. 2 is an aerofoil section and has the properties of such a section. The front section 20 curves inwardly at its leading edge and is preferably turned or rolled about a reinforcing tube or rod 23 (see Fig. 11).

The cowling ring is supported by a supporting ring 24 which ring is preferably constructed of tubular material and is so dimensioned that the forward end of the rear ring section 21 will fit neatly over it. The ring 24 is provided at spaced intervals with a plurality of brackets each of which brackets consists of a pair of tubes 25, see Figs. 1, 7 and 9, which at their outer ends are preferably welded to the ring 24 and converge towards their inner ends, which are welded or otherwise suitably secured to a small angle shaped bracket 26. The tubes 25 and the supporting ring 24 are preferably arranged in coplanar relationship and so that each respective bracket 26 will lie against the face of a flange 28 of one of the cylinders 22. The bracket 26 is provided with an aperture 27 so that the bracket may be bolted to the engine by one of the bolts 29 employed for clamping to the engine the flanged end of either an exhaust or intake conduit as the case may be. In the particular constructional example illustrated three supporting members 25, 26 are located at equally spaced intervals about the interior of the ring. These members are arranged alternately with the members of a second set of three supporting members also equally spaced about the ring. The latter members consist of tubes 30, see Fig. 1, which at their outer ends are suitably secured to the supporting ring 24 and which diverge inwardly and have secured to their inner ends brackets or plates 31, apertured to permit a securing bolt to be passed through such brackets. The supporting members 30, 31 are arranged so that the brackets 31 will contact with the faces of the exhaust conduit flanges 28 of a pair of adjacent cylinders 22 and are, like the brackets 26, clamped to the engine by one of the bolts 29 used for clamping a conduit to the engine.

For permitting ready access to the engine for inspection and servicing, the front ring section 21 is secured in place, as will be hereinafter more fully described, by quickly detachable securing means, while the rear ring section is secured in position by a greater number of fastening devices than is the front section, and together with the supporting ring 24 and supporting members 25, 26 form the main support for the entire cowling ring. As an additional bracing means for preventing vibration or fluttering of the cowling, there is provided a plurality of supporting members 32, see Figs. 2, 8 and 12, which extend from the rear edge of the rear section 21 to the engine. These members 32, are preferably formed of a tube of metal bent to a V-shape as shown in Fig. 8. At the closed end of the V the tube is cut away and pressed out to provide a flat bearing portion 33 which is provided with an aperture 34. To the outer end of each leg of the V is welded, or otherwise suitably secured, a small knee bracket 35, each of which brackets is provided with an aperture 36, as clearly shown in Fig. 1. The respective members of the pair of brackets 35 for each V-shaped supporting member 32 as shown are adapted to engage with the faces of the flanges of the inlet and exhaust ports of an adjacent pair of cylinders 22, and to be bolted to the engine by the conduit securing bolts. The portion 33 of the V-shaped supporting members 32 is secured to the ring section 21 adjacent to the rear edge thereof by means of a bolt 37, the ring section 21 adjacent to such rear edge being provided with an annular reinforcing plate 38, as shown in Fig. 12. Adjacent to its front end the rear section 21 is supported by the supporting ring 24 and also by means of a plurality of brackets 39 which extend laterally from the supporting ring 24 and rearwardly thereof. The brackets 39, as clearly shown in Figs. 9 and 10, are apertured for the insertion of a bolt 40 which passes through a suitable aperture in the wall of the ring section 21.

At its forward end the metal of the ring section 21 is folded inwardly upon itself, as indicated by the reference character 41, in Fig. 9, and just to the rear of said fold 41 the metal is flanged inwardly, as indicated by the reference character 42, to provide, on the forward end of the ring section 21, an attaching portion of reduced diameter. At suitably spaced intervals about the ring section 21 is a plurality of plates 43, suitably secured to the ring section 21, as by rivets 44. These plates 43 extend forwardly and are shaped to fit snugly against the outer face of the reinforced folded edge of the ring section. An open end slot 45 formed in each plate 43 and the folds of the metal of the ring section below such plate, extends inwardly from the front edge of the reduced front portion of the ring section.

The rear edge of the front rear section 20 is also folded over for the purpose of reinforcing the same and secured to the front ring section at spaced intervals about it are a plurality of plates 46, there being one plate 46 on the front ring section for each plate 43 on the rear ring section. Secured to the inner face of the front rear section 20 just below each attaching plate 46 is a bracket 47 shown most clearly in Fig. 9. Each bracket 47 has a pair of side flanges and a rear flange 48 continuous with said side flanges. At its lower end the rear flange 48 is provided with a slot 49 through which is adapted to pass a bolt 50. The bolt 50 is threaded on one end to receive a wing nut 51, and at its other end is pivotally secured, as at 52, within the jaws of a yoke 53 provided on the lower end of a headed clamping stud 54. The studs 54 are supported within suitable apertures spaced about the supporting ring 24. The arrangement of the parts just described is such that each clamping stud 54 is normally held in its respective aperture in the ring 24 to extend radially of the supporting ring 24, and with the enlarged head portion thereof extending outwardy beyond said supporting ring a sufficient distance to permit the plates 43 and 46 of the ring sections 20 and 21 respectively to be engaged under the head of the bolt 54 in overlapping relationship, the slots 45 and 49 permitting the ring sections and said plates to be slid laterally under the heads of the bolts, in a manner that will be readily understood, to assemble or disassemble the cowling. After the ring sections are assembled they are clamped securely in such relationship by the action of the bolt 50 and nut 51; the tightening of the nut against the flange 48 of the bracket 47 draws the rear edge of the front section 20 tightly against the flange 42 of the rear section 21. A compensating washer 56 is preferably interposed between the flange 48 of the bracket 47 and the wing nut 51.

Figure 6:
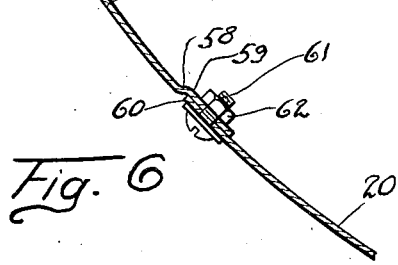
Fig. 6 is a section of the ring taken substantially on the line 6—6 of Fig. 2.

For the purpose of facilitating the installation or removal of the ring sections, each ring section 20 and 21 is slit from front to rear, such slit being indicated in Fig. 2 by the reference numeral 57. The material of the rings adjacent to the slit is arranged to be placed in overlapping relationship as indicated in Fig. 6, one end of the material being offset inwardly as indicated by the reference character 58. The lapping portions of the ring sections at the slit are indicated in Fig. 6 by the reference characters 59 and 60 and such lapping sections are provided at suitably spaced intervals with apertures through which the bolts 61 are adapted to pass, said bolts having nuts 62 threaded thereon for tightening, the ends of the ring sections together in lapped relationship. At the slit portion of the front ring, the reinforcing tube in the rolled front edge of said section terminates short of the lap 59 as clearly shown in Fig. 5 thereby to provide a socket 63. The other end of the ring section has inserted therein a dowel which is secured to the rolled bead by any suitable means such as the rivets 65. The lap 60 is cut away as indicated by the reference character 66 to provide clearance which permits the laps 59, 60 to be placed in overlapping relationship without interference from the beaded front edge of the section.

Secured to the inner face of the ring section 20 at suitably spaced intervals is a plurality of buffer pads 67 of any suitable soft or yielding material. These pads are arranged to engage the projecting inner parts of the engine that would otherwise contact with the ring and obviate metal to metal contact between the cowling ring and the engine and the objectionable noise that would arise from such contact.

The manner in which the parts are assembled is as follows:

The supporting ring 24 is first secured to the engine by means of the supporting members 25, 26, 30 and 31. These members being bolted to the engine by the same bolts which secure the exhaust and inlet conduits to the flanges or bosses of the cylinders 22, as will be readily understood. The V-shaped supporting members 32 for the rear cowling ring section 21 are also secured to the engine's cylinders by the bolts which secure the exhaust and intake conduits to the cylinders. After the supporting ring and V-shaped supporting members 32 are securely bolted to the engine the cowling ring section 21 with its slit end opened is placed over the propeller in the manner indicated in Fig. 14. After the ring section has been brought down to a position substantially in line with the engine the slit end of the ring section is forced open by springing the ring section a sufficient distance to permit the slit open end of the ring to pass the propeller as indicated in Fig. 14. The ring section 21 is then slid rearwardly over the engine cylinders past the studs 54 and is then moved forwardly to cause the slots 45 to straddle said studs 54 with the plates 43 lying under the enlarged heads of said studs. The parts are so arranged that after the rear ring section is engaged with the studs 54 the section will be in such a position upon the V-shaped brackets 32 as to bring the apertures provided in the rear end of the ring section in alignment with the apertures 34 in the members 32 and also so that the apertures in the brackets 39 will be in alignment with the holes provided in the forward end of the ring section 21 for receiving the bolts 40. The bolts 40 and 37 are then inserted in position and tightened in place by their respective nuts.

The forward ring section 20 is then slipped over the propeller in a manner similar to that just described. After the slit end of the ring section 20 has been moved rearwardly past the propeller the ring section is slid rearwardly over the engine and the reinforced rear end thereof is slid over the front reduced reinforced end of the ring section 21 and with the slots 55 in the plates 46 and in the rear end of the section, in engagement with the outer ends of the studs 54. Prior to the engagement of the front ring section 20 with the rear ring section 21, the slit ends of the ring section 20 are brought into overlapping engagement, the bolts 61 are inserted in the apertures provided for them and the nuts 62 threaded into the bolts and tightened home. After the two ring sections 20, 21 are placed in engagement, the pivoted bolts 50 are swung upwardly into the slots 49 of the brackets 47 and the wing nuts 51 are tightened up to clamp the front ring section 20 in securely locked engagement with the rear ring section 21.

If it is desired to remove the front ring section 21 for inspection or surfacing of the engine, this can readily be accomplished by unloosening the wing nuts 51 and swinging the bolts 50 upon their pivots 52 downwardly and rearwardly out of engagement with the brackets 47. The bolts 61 that hold the slit ends of the ring section together are then removed and the front and rear section can be taken off by a reversal of the procedure employed for placing the same on the engine. It will not ordinarily be necessary for the usual minor repairs and servicing to remove the rear ring section 21.

It will be seen from the above that the entire cowling ring is very substantially and rigidly attached to the engine by the supporting ring 24 which in turn is securely fastened to the engine by a comparatively large number of diametrically opposed brackets. The front ring section is clamped tightly to the rear ring section and to the substantially rigid supporting ring 24 at a plurality of spaced points by readily accessible and quickly detachable securing means. The provision of the V-shaped supporting members 32 which are secured at their inner ends directly to the engine and which are bolted to the rear reinforcing edge of the rear ring section 21 together with the securing of the front end of the rear ring section by the brackets 39, and bolts 40, as well as by the clamping studs 54, results in securing what may be termed a triangulated truss attachment for the entire cowling ring such as will resist most efficiently those forces to which the ring is subjected during the flight of the airplane.

As shown most clearly in Fig. 2 the cross section of the completely assembled ring comprising the rear sections 20 and 21 is an airfoil section which in flight will extend at a positive angle of incidence. The design of the airfoil section is such as to insure a down wash of the air stream towards the body of the nacelle to the rear of the engine thereby markedly decreasing, if not eliminating entirely, the objectionable effects of turbulence in the air stream that would otherwise result from the projecting cylinders of the engine.

While the cowling ring has been shown as applied to an engine mounted on the front end or nose of a fuselage, it will be understood that it can be employed in connection with outboard engines supported by the wings of the plane or with an engine located in any other portion on the plane.

It will be understood that the particular shape, the number and the location of the supporting brackets employed in connection with the supporting ring 24 as herein shown and described are merely illustrative and that the invention is not limited to such specific details. It will likewise be understood that the invention is not limited to the bolting of the supporting bracket members to the respective exhaust and inlet conduits as shown and described. Likewise many other changes, variations and modifications from the specific details of the example herein selected for the purpose of illustrating the invention may be resorted to without departing from the principles of such invention.

I claim:

1. A cowling ring for engines comprising a front ring section and a rear ring section and means for detachably connecting said sections together to form a substantially continuous airfoil surface of streamline contour.

2. A cowling ring for engines comprising a front ring section and a rear ring section and means for detachably connecting said sections together to form a substantially continuous airfoil surface of streamline contour and means for connecting said cowling ring to the engine comprising a plurality of supporting brackets.

3. A cowling ring for engines comprising an annular supporting member, a plurality of supporting members secured to said annular member and extending inwardly thereof, means at the inner ends of said supporting members for securing the same to the engine with said annular member in concentric relationship, a front ring section and a rear ring section and means for detachably securing said ring sections to said annular member.

4. A cowling ring for engines comprising an annular supporting member, a plurality of supporting members secured to said annular member and extending inwardly thereof, means at the inner ends of said supporting members for securing the same to the engine with said annular member in concentric relationship therewith, a front ring section, and a rear ring section, means for detachably securing said ring sections to said annular member, a plurality of brackets extending inwardly from said rear ring section, and means at the inner ends of said brackets for securing the same to the engine.

5. A cowling ring for engines comprising an annular supporting member, a plurality of supporting members secured to said annular member and extending inwardly thereof, means at the inner ends of said supporting members for securing the same to the engine with said annular member in concentric relationship therewith, a front ring section and a rear ring section, means for detachably securing said ring sections to said annular member, and quick detachable means carried by said annular member for engagement with said front and said rear ring sections.

6. In a cowling ring for engines, a front ring section and a rear ring section, said sections being provided with cooperating portions arranged to engage one within the other in overlapping telescopic relationship, means for clamping said sections together in said relationship and means for securing the assembled ring sections to the engine.

7. In a cowling ring for engines, a front ring section and a rear ring section, one of said sections being provided with a reduced annular flange, and the other of said sections being adapted to engage telescopically over said flange, quickly detachable means for engaging the telescopically engaged portion of said ring sections for clamping them securely in said engagement, and means including a plurality of spaced brackets for securing said assembled ring sections to the engine.

8. In a cowling ring for engines, a front ring section and a rear ring section, each of said ring sections being split to permit them to be sprung open for ready installation or removal thereof to and from the engine, means for securing together the ends of each ring section at the split thereof, quickly detachable means for securing said ring sections together in axially aligned juxtaposed relationship, said ring sections when assembled forming a continuous airfoil surface of streamline contour, and means for securing the assembled ring sections to the engine.

9. In a cowling ring for engines, an annular supporting member, a plurality of brackets extending inwardly therefrom, means at the inner end of said brackets for securing said annular member to said engine in concentric relationship therewith, a rear ring section supported upon said annular member, said annular member being provided with a plurality of spaced clamping devices, a front ring section having a rear portion adapted to engage telescopically within the front portion of said rear ring section, and said rear and front portions of said front and rear sections respectively being provided with means for engagement with the clamping devices carried by said annular member, said front and rear ring sections when secured in telescopic engagement forming a continuous airfoil surface of streamline contour surrounding said engine.

10. In a cowling ring for engines an annular supporting member, a plurality of brackets extending inwardly therefrom, means at the inner end of said brackets for securing said annular member to said engine in concentric relationship therewith, a rear ring section supported upon said annular member, said annular member being provided with a plurality of spaced clamping devices, a front ring section having a rear portion adapted to engage telescopically within the front portion of said rear ring section, and said rear and front portions of said front and rear sections respectively being provided with means for engagement with the clamping devices carried by said annular member, said front and rear ring sections when secured in telescopic engagement forming a continuous airfoil surface of streamline contour surrounding said engine; each of said ring sections being split from front to rear to permit them to be sprung open to facilitate installation or removal of said sections to and from the engine, and means for securing together the ends of each ring section at their split portions.

11. A cowling ring for engines comprising a pair of split ring sections, means for securing together the ends of each ring section at the split portion thereof, one of said ring sections being provided with a reduced annular flange dimensioned to fit neatly within the other ring section, a plurality of brackets for securing one of said ring sections to the engine, and a plurality of quickly detachable fastening devices for securing the other of said ring sections to said one ring section.

12. A cowling ring for engines comprising a front ring section and a rear ring section, each of said ring sections being split from front to rear thereof and being provided with means for detachably securing together the split ends thereof, an annular supporting member, a plurality of spaced brackets for securing the supporting member to the engine, a plurality of quickly detachable clamping devices, carried by said annular member, said rear ring section having a reduced annular flange at its front end and fitting neatly over said annular member and for engaging telescopically within the rear portion of said front ring section, and said front and rear ring sections being provided at their rear and front edges respectively with means for engagement by said clamping devices, and a plurality of brackets extending from the rear of said rear ring section to said engine and means for securing said brackets to said engine.

13. A cowling ring for engines comprising a front ring section and a rear ring section, each of said ring sections being split from front to rear thereof and being provided with means for detachably securing together the split ends thereof, an annular supporting member, a plurality of spaced brackets for securing the supporting member to the engine, a plurality of quickly detachable clamping devices, carried by said annular member, said rear ring section having a reduced annular flange at its front end for fitting neatly over said annular member and for engaging telescopically within the rear portion of said front ring section, said front and rear ring sections being provided at their rear and front edges respectively with means for engagement by said clamping devices, a plurality of spaced brackets extending from the engine to the front and rear portions of said rear ring section, means for securing said brackets to said engine, and means for detachably securing said rear ring section to said last named brackets.

14. A cowling ring for engines comprising a front ring section and a rear ring section, an annular supporting member and means for securing the same to said engine, a plurality of spaced headed studs carried by said annular member, said front and rear ring sections being provided with a plurality of spaced members for engagement with said headed studs, and clamping devices carried by said studs.

15. In a cowling ring for engines, a front ring section and a rear ring section, an annular supporting member, means for securing said annular member to said engine, a plurality of spaced headed studs carried by said annular member, spaced reinforcing members carried by said front and rear sections, said front and rear sections and said reinforcing members being provided with open ended slots for the engagement of said reinforcing members and said ring sections with said studs by an axially sliding movement of said ring sections relatively to said annular member, a plurality of brackets extending inwardly from one of said ring sections, and a wing nut and bolt pivotally secured to each of said studs for engagement with said brackets for drawing said ring sections axially together and securing them in clamped axially aligned relationship.

16. In aircraft, an aerial vehicle, a body forming a part of said aerial vehicle, projections extending outward from said body, a one-piece resilient strip surrounding said body and bearing on said projections, and means for fastening the ends of said strip to each other.

17. In aircraft, a motor, a cowling ring, and means secured to said ring and bearing on said motor but not secured to said motor.

18. In aircraft, an engine having outwardly extending parts, a cowling ring comprising a unitary strip of resilient material formed in the shape of a ring surrounding said engine and bearing on said outwardly extending parts but not secured thereto, and means for securing the ends of said strip to each other.

19. Aeroplane anti-drag-ring for use with radial type engines, comprising an anti-drag-ring and a series of pads on the inner surface of said ring, adapted to engage projections carried by the head of each cylinder of a radial type engine.

20. In a split annular cowling of the type adapted to be disposed without the periphery of the cylinders of a radial aircraft engine, means carried by said cowling and adapted to cooperate with a part of said engine for floatably supporting said cowling on said engine, and means for clamping said cowling to said engine.

HAROLD A. HICKS.